No. 614,060.  
J. M. PHELPS.  
LINE TIGHTENING AND SUPPORTING DEVICE.  
(Application filed May 16, 1898.)  
Patented Nov. 8, 1898.

(No Model.)

Witnesses  
Inventor  
J. M. Phelps.  
By his Attorney

UNITED STATES PATENT OFFICE.

JAMES M. PHELPS, OF DENVER, COLORADO, ASSIGNOR TO EDWARD N. CLEMENTS AND MARY D. PHELPS, OF SAME PLACE.

LINE TIGHTENING AND SUPPORTING DEVICE.

SPECIFICATION forming part of Letters Patent No. 614,060, dated November 8, 1898.

Application filed May 16, 1898. Serial No. 680,848. (No model.)

*To all whom it may concern:*

Be it known that I, JAMES M. PHELPS, a citizen of the United States of America, residing at Denver, in the county of Arapahoe and State of Colorado, have invented certain new and useful Improvements in Line Tightening and Supporting Devices, of which the following is a specification.

My invention relates to improvements in line tightening and supporting devices, being more especially intended for use in connection with clothes-lines, but which may be employed to equal advantage with lines used for other purposes.

My object is to provide a device of this class which shall be simple in construction, economical in cost, reliable, durable, and efficient in use; and to these ends the invention consists of the features hereinafter described and claimed, all of which will be fully understood by reference to the accompanying drawings, in which is illustrated an embodiment thereof.

Figure 1:
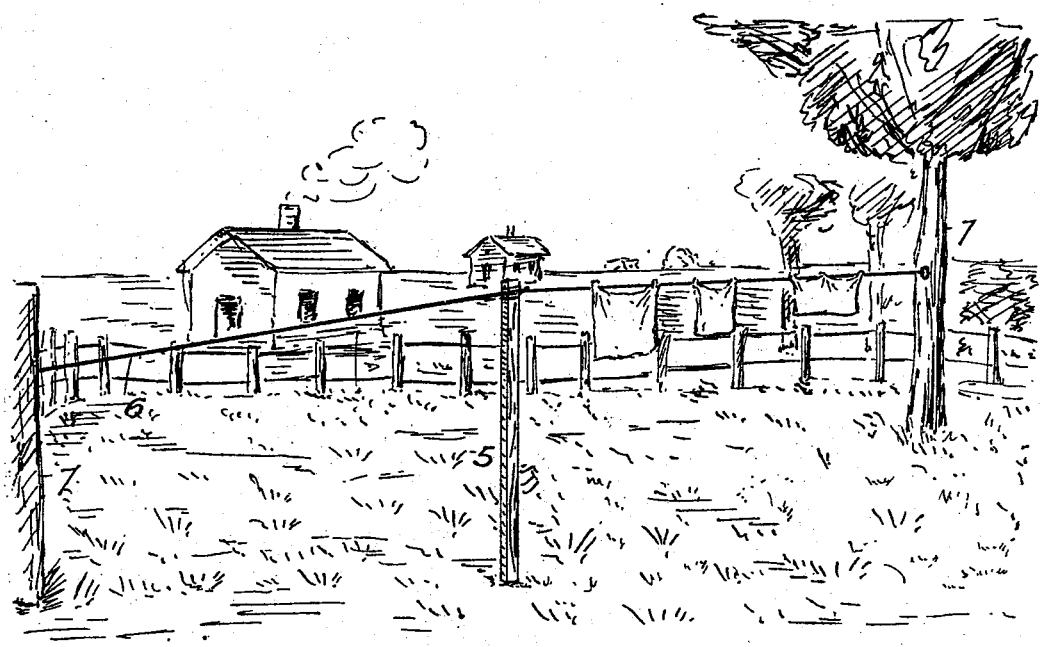
Figures 2, 3:
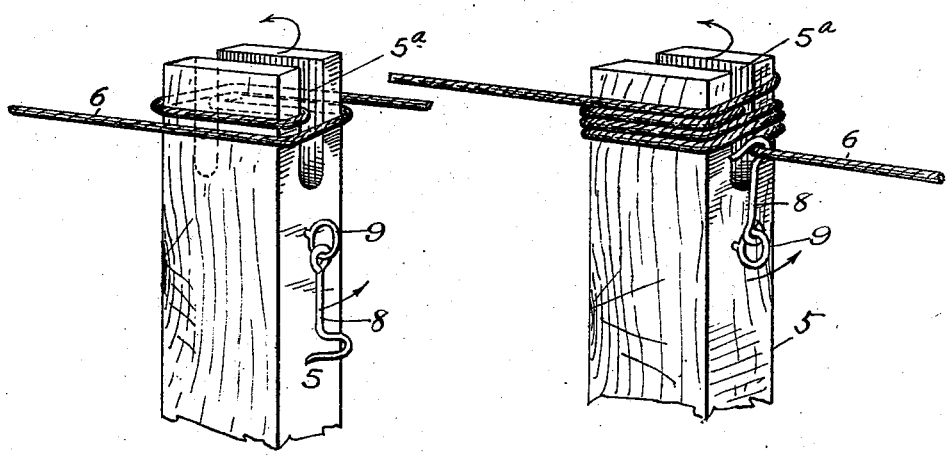

In the drawings, Figure 1 is a perspective view showing my improved device in use. Fig. 2 is a detail view of the device shown at the beginning of the tightening operation and on a larger scale, the lower portion of the supporting-bar being broken away. Fig. 3 is a similar view illustrating the device when the tightening operation is complete and the fastening-hook applied.

Similar reference characters indicating corresponding parts in the views, let the numeral 5 designate a bar having a slot $5^a$ formed in its upper extremity. The line 6, to which the device is applied, has its extremities respectively secured to two stationary supports 7. (See Fig. 1.) In using the device the line at some point intermediate its extremities is placed in the slot $5^a$ of the bar 5.

In order that my device may be properly understood, I will assume that the line is loose and sagging to permit easy access thereto by the person placing clothes or other articles thereon. The line having been loaded with garments, it is always desirable to raise it farther from the ground both to facilitate the drying of the articles and to prevent them from soiling by coming in contact with other objects. The bar 5, having been applied to the line, as above stated, is turned in the direction indicated by the arrows, (see Figs. 2 and 3,) thus winding the line around the bar, as shown, and taking up the slack therein until the line is drawn taut or tightened to the desired extent. The line and bar are then fastened in this position by means of a hook 8, suspended on the bar by a screw-eye 9 or any other suitable device adapted to support the hook in a swinging position. The hook is thrown over the line on one side of the bar in the manner shown in Fig. 3, thus preventing the bar from turning in the opposite direction and maintaining the line in the taut condition to which it has been drawn by turning the bar in the direction indicated by the arrows in Figs. 2 and 3. The lower extremity of the bar 5, or that remote from the slot $5^a$, is then placed upon the ground, whereby the bar becomes a line-supporting as well as a line-tightening device.

Having thus described my invention, what I claim is—

1. A line-tightener comprising a bar having a slot in one extremity, and a hook suspended on the bar in a swinging position and in proximity to the slot therein for the purpose set forth.

2. In a line tightening and supporting device, the combination of a bar having a slot in one end to receive the line, the other end being adapted to rest upon the ground or other surface, a hook suspended on the bar in a swinging position, in proximity to the slot and adapted to engage the line and prevent a reverse movement of the bar after the latter has been turned for the purpose of tightening the line.

JAMES M. PHELPS.

Witnesses:
K. M. LAURIE,
JAMES B. ROSS.